US012701318B2

(12) United States Patent
Kumar Agrawal et al.

(10) Patent No.: US 12,701,318 B2
(45) Date of Patent: Aug. 4, 2026

(54) METHODS AND ELECTRONIC DEVICES FOR ENABLING A VIDEO RECORDING MODE OF OPERATION AS A FUNCTION OF DEVICE GEOMETRY AND SUPPORT CONDITION

(71) Applicant: Motorola Mobility LLC, Chicago, IL (US)

(72) Inventors: Amit Kumar Agrawal, Bangalore (IN); Bill Ryan, Libertyville, IL (US); Daniel M Vacura, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/676,308

(22) Filed: May 28, 2024

(65) Prior Publication Data

US 2025/0373931 A1 Dec. 4, 2025

(51) Int. Cl.
| | |
|---|---|
| *H04N 23/667* | (2023.01) |
| *H04N 23/53* | (2023.01) |
| *H04N 23/60* | (2023.01) |
| *H04N 23/61* | (2023.01) |
| *H04N 23/63* | (2023.01) |

(52) U.S. Cl.
CPC ........... *H04N 23/632* (2023.01); *H04N 23/53* (2023.01); *H04N 23/61* (2023.01); *H04N 23/667* (2023.01)

(58) Field of Classification Search
CPC .............................. H04N 23/667; H04N 23/60
USPC ....................................................... 348/169
See application file for complete search history.

(56) References Cited

U.S. PATENT DOCUMENTS

| | | | |
|---|---|---|---|
| 9,971,314 B2 | 5/2018 | Lee | |
| 11,635,931 B2 | 4/2023 | Kumar Agrawal | |
| 2015/0121228 A1* | 4/2015 | Lee ...................... | G06F 1/3265 |
| | | | 715/740 |
| 2015/0348453 A1 | 12/2015 | Jin | |
| 2016/0119552 A1 | 4/2016 | Oh | |
| 2016/0239190 A1 | 8/2016 | Forutanpour | |
| 2017/0018248 A1 | 1/2017 | Na | |
| 2020/0335063 A1 | 10/2020 | Kim | |
| 2023/0188827 A1 | 6/2023 | Ito | |
| 2024/0077956 A1 | 3/2024 | Lee | |

(Continued)

OTHER PUBLICATIONS

"Nubia Watch", Flexible wristwatch; Unknown exact availability date but believed to be prior to filing of present application; Available online at https://www.nubiamart.com/nubia-watch.html?srsltid=AfmBOopV9m6natcLzCC8Q19r_8GSen9YwaVePoUZntvX44gQTAoCR-JA.

(Continued)

*Primary Examiner* — Jeffery A Williams
(74) *Attorney, Agent, or Firm* — Philip H. Burrus, IV

(57) ABSTRACT

A method in an electronic device includes detecting, with one or more sensors, a wrapped geometric form factor defined by a flexible display supported by a deformable housing. The method also includes detecting, with one or more other sensors, gesture input indicating a camcorder support condition is supporting the electronic device in three-dimensional space while the wrapped geometric form factor is occurring. Thereafter, the method enables, with one or more processors in response to detecting the wrapped geometric form factor and the camcorder support condition, an image capture mode of operation of an image capture device of the electronic device.

20 Claims, 10 Drawing Sheets

(56) References Cited

U.S. PATENT DOCUMENTS

| | | |
|---|---|---|
| 2024/0319768 A1 | 9/2024 | Kumar Agrawal |
| 2024/0320930 A1 | 9/2024 | Ravasz |
| 2025/0133158 A1 | 4/2025 | Emmert |

OTHER PUBLICATIONS

"The Most Futuristic Flexible Display Phone", YouTube; Unbox Therapy Channel; Nubia Alpha Watch; Premiered Mar. 29, 2029; available at https://www.youtube.com/watch?v=JbY8DM8c-h0&t=292s.

Mertens, , "Both Samsung and LG unveil new smartwatches with flexible (plastic-based) AMOLEDs", OLED-info; Aug. 28, 2024; available online at https://www.oled-info.com/both-samsung-and-lg-unveil-new-smartwatches-flexible-plastic-based-amoleds.

"Galazy Z Flip", Unknown exact availability date but believed to be prior to filing of present application; Viewed online May 6, 2021 at https://www.samsung.com/us/mobile/galaxy-z-flip/.

Kumar Agrawal, Amit, "Methods and Elecronic Devices Enabling a Video Recording Mode of Operation as a Function of Support Conditon", Application as filed on Apr. 22, 2024; U.S. Appl. No. 18/642,540.

Soto Lopez, Jose R., "Non Final Office Action", U.S. Appl. No. 18/676,303 filed May 28, 2024; Mailed Apr. 23, 2025.

Peterson, Christopher K., "Notice of Allowance", U.S. Appl. No. 18/642,540 filed Apr. 22, 2024; Mailed May 5, 2026.

Peterson, Christopher K., "Non-Final Office Action", U.S. Appl. No. 18/642,540 filed Apr. 22, 2024; Mailed Jan. 12, 2026.

Soto Loez, Jose, "Final Office Action", U.S. Appl. No. 18/676,303 filed May 28, 2024; Mailed Oct. 22, 2025.

* cited by examiner

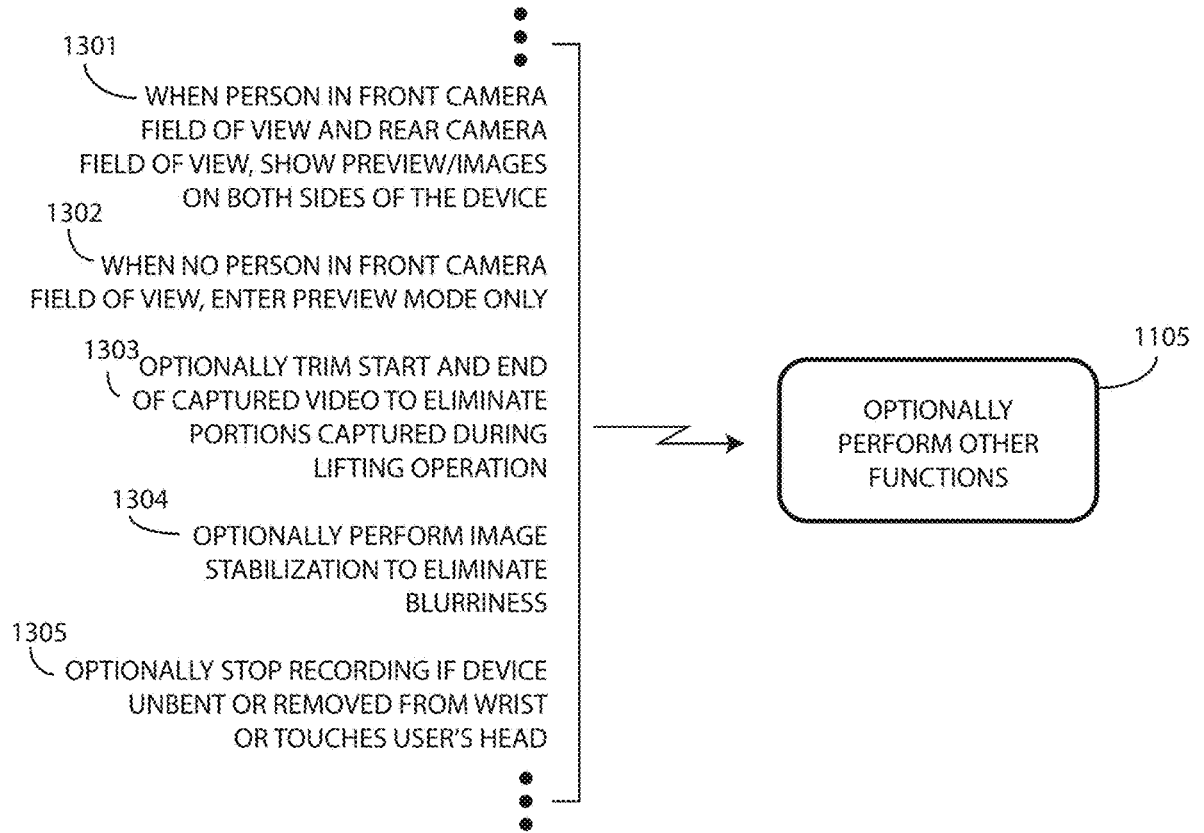

1301 — WHEN PERSON IN FRONT CAMERA FIELD OF VIEW AND REAR CAMERA FIELD OF VIEW, SHOW PREVIEW/IMAGES ON BOTH SIDES OF THE DEVICE

1302 — WHEN NO PERSON IN FRONT CAMERA FIELD OF VIEW, ENTER PREVIEW MODE ONLY

1303 — OPTIONALLY TRIM START AND END OF CAPTURED VIDEO TO ELIMINATE PORTIONS CAPTURED DURING LIFTING OPERATION

1304 — OPTIONALLY PERFORM IMAGE STABILIZATION TO ELIMINATE BLURRINESS

1305 — OPTIONALLY STOP RECORDING IF DEVICE UNBENT OR REMOVED FROM WRIST OR TOUCHES USER'S HEAD

1105 — OPTIONALLY PERFORM OTHER FUNCTIONS

*FIG. 13*

METHODS AND ELECTRONIC DEVICES FOR ENABLING A VIDEO RECORDING MODE OF OPERATION AS A FUNCTION OF DEVICE GEOMETRY AND SUPPORT CONDITION

BACKGROUND

Technical Field

This disclosure relates generally to electronic devices, and more particularly to deformable electronic devices.

Background Art

Portable electronic communication devices, especially smartphones, have become ubiquitous. People all over the world use such devices to stay connected. These devices have been designed in various mechanical configurations. A first configuration, known as a "candy bar," is generally rectangular in geometric configuration, has a rigid form factor, and has a display disposed along a major face of the electronic device. By contrast, a "clamshell" device has a mechanical hinge that allows one housing to pivot relative to the other.

Some consumers prefer fixed geometric configuration devices such as candy bar devices. However, many others prefer deformable electronic devices such as clamshell devices. It would be advantageous to have an improved electronic device can operate in both deformed and non-deformed states.

BRIEF DESCRIPTION OF THE DRA WINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 13 illustrates one or more explanatory method steps in accordance with one or more embodiments of the disclosure.

Figure 1:
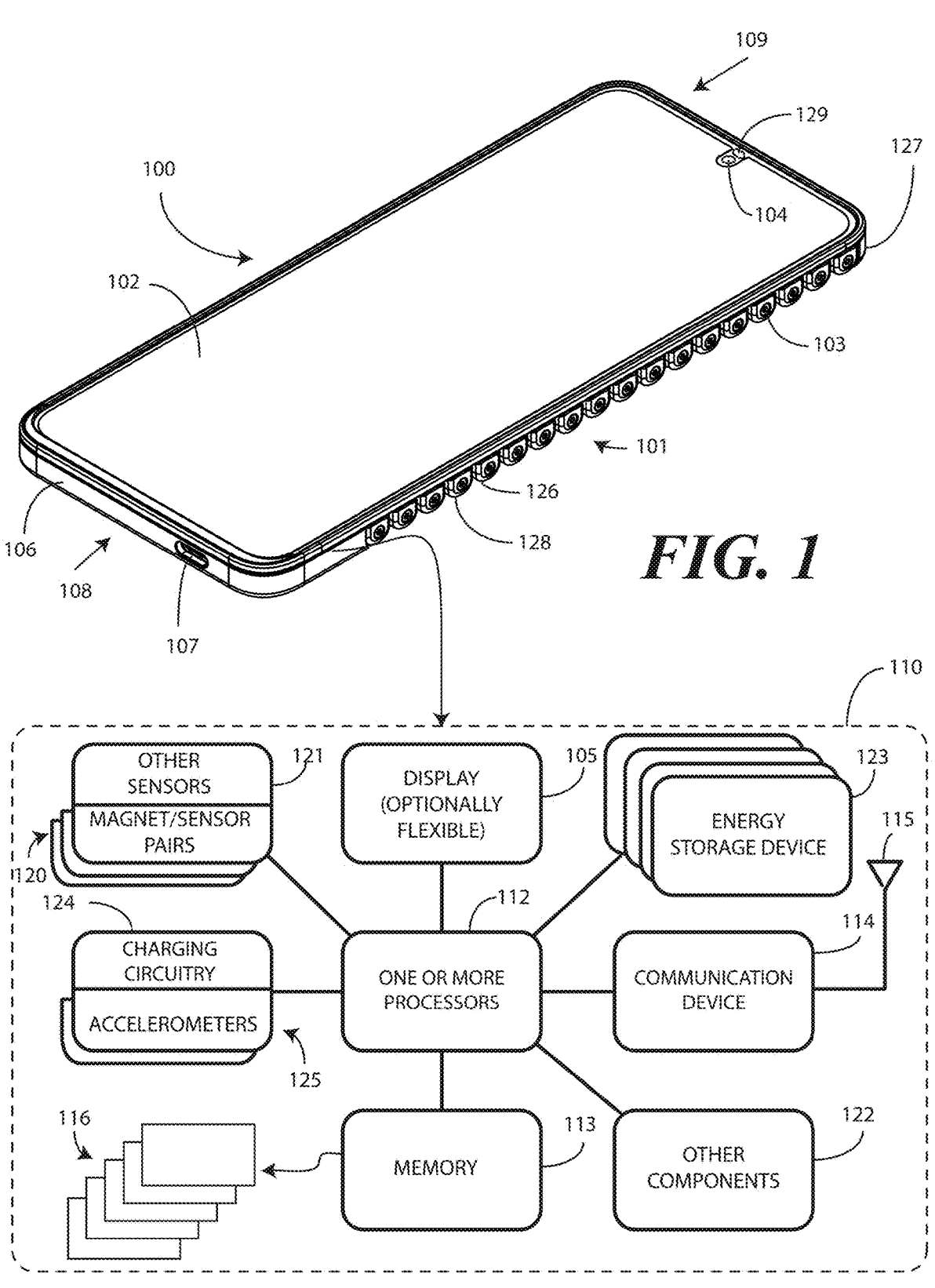
FIG. 1 illustrates one explanatory deformable electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to enabling, in response to detecting a wrapped geometric form factor defined by a flexible display supported by a deformable housing, and also in response to detecting, with one or more other sensors, gesture input indicating a camcorder support condition is supporting the electronic device in three-dimensional space while the wrapped geometric form factor is occurring, enabling, with one or more processors in response to detecting the wrapped geometric form factor and the camcorder support condition, a video recording mode of operation of an image capture device of the electronic device. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of causing an image capture device to enter a video recording mode of operation in response to the electronic device being supported in a camcorder orientation while the electronic device is in a wrapped, wrist-worn geometric configuration. As such, these functions may be interpreted as steps of a method to perform, in response to at least a first sensor detecting a deformable device housing of the electronic device being transitioned into a wrapped geometry about a wrist and at least a second sensor detecting a rotational lifting operation, causing an image capture device of an electronic device to enter a video recording mode of operation.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Electronic devices with flexible displays have introduced new possibilities for user interaction and functionality. These devices can transform into various form factors, such as flat, tent, or wrist-worn configurations, adapting to different use cases. However, the integration of camera functionality within such adaptive devices presents challenges, particularly when attempting to replicate traditional camcorder experiences. Existing solutions often require manual interaction to initiate and control video recording, which can be cumbersome and interrupt the user's engagement with the subject matter of the recording.

Current adaptive display devices, while versatile, lack intuitive methods for enabling and disabling camera modes, especially in configurations where the device is worn on the body. Users typically need to navigate through menus or press physical buttons to start or stop video recording, which can be inconvenient and detract from the spontaneity of capturing moments. Furthermore, the ability to provide a "dual preview" mode of operation, which allows both the subject and the recorder to view the footage simultaneously, is not adequately addressed in existing designs. These limitations hinder the user experience and reduce the practicality of adaptive display devices in dynamic recording scenarios.

The present disclosure relates to a method and system for managing a gesture-based camcorder mode on an adaptive wearable display device. The system leverages the form factor of an adaptive display device that can dynamically transform into different configurations, such as a wrist-worn accessory. By utilizing a combination of sensors, including an Inertial Measurement Unit (IMU) and flex sensors, the device detects specific user gestures that correspond to the initiation and cessation of video recording. This gesture-based control facilitates a hands-free operation that enhances the user experience by providing a more natural and seamless interaction with the device's camera functionality. Additionally, the system intelligently manages the display of the video preview, offering a dual-preview mode that allows both the recorder and the subject to view the recording in real-time, depending on the presence of a person within the camera's field of view.

In one or more embodiments, a method in an electronic device comprises detecting, with one or more sensors, a wrapped geometric form factor defined by a flexible display and a deformable housing. In one or more embodiments, the method also detects, using one or more other sensors, gesture input indicating a camcorder support condition is supporting the electronic device in three-dimensional space while the wrapped geometric form factor is occurring. In one or more embodiments, the method comprises enabling, with one or more processors in response to detecting the wrapped geometric form factor and the camcorder support condition, an image capture mode of operation of an image capture device of the electronic device.

In one or more embodiments, by detecting a wrapped geometric form factor defined by a flexible display supported by a deformable housing, the electronic device can recognize when it is being worn on the user's body, such as around the wrist. This allows for the automatic adjustment of the device's functionality to suit its current form factor, enhancing the user experience by providing context-sensitive operations.

The detection of gesture input indicating a camcorder support condition in three-dimensional space while the device is in the wrapped form factor enables the device to initiate an image capture mode of operation. This feature allows for hands-free operation of the device's camera, facilitating ease of use and convenience for the user when transitioning to image or video capture tasks.

Enabling an image capture mode of operation in response to the detected form factor and gesture input allows the device to seamlessly transition into a camera-ready state. This integration of form factor recognition with gesture-based controls provides an intuitive and efficient way for users to engage with the device's camera features without the need for manual activation, thereby streamlining the user interaction process.

In one or more embodiments, an electronic device comprises a deformable housing comprising a plurality of linkage members and a flexible display supported by the deformable housing. In one or more embodiments, the electronic device comprises one or more sensors operable to determine a wrapped, wrist-worn geometric configuration of the electronic device and one or more other sensors operable to detect when the electronic device is supported in a camcorder orientation in three-dimensional space. In one or more embodiments, the electronic device comprises an image capture device and one or more processors. In one or more embodiments, the one or more processors cause the image capture device to enter a video recording mode of operation in response to the electronic device being supported in the camcorder orientation while the electronic device is in the wrapped, wrist-worn geometric configuration.

By integrating a deformable housing with a plurality of linkage members and a flexible display, the electronic device can achieve a wrapped, wrist-worn geometric configuration that is conducive to on-body wear, such as a wristwatch. This configuration allows for a more ergonomic and accessible user experience, particularly in mobile or active scenarios where traditional handheld devices may be cumbersome.

The combination of one or more sensors with the ability to detect a camcorder orientation in three-dimensional space, along with the image capture device and processors, facilitates a seamless transition into a video recording mode of operation. This transition is triggered by the specific physical orientation of the device, which is indicative of the user's intent to record video, thereby enhancing the intuitiveness and ease of use of the device's camera functions.

The one or more processors' capability to work in conjunction with the sensors and the image capture device to enter a video recording mode when the device is in a specific orientation (wrapped, wrist-worn geometric configuration and supported in a camcorder orientation) provides a hands-free operation that is particularly useful for capturing spontaneous moments or for users who require the use of their hands for other tasks while recording.

In one or more embodiments, a method in an electronic device comprises detecting, with at least a first sensor, a deformable device housing of the electronic device being transitioned to a wrapped geometry about a wrist. In one or more embodiments, the method comprises detecting, with at least a second sensor, a rotational lifting operation of the electronic device in three-dimensional space. In one or more embodiments, in response to the at least a first sensor detecting the wrapped geometry about the wrist and the at least a second sensor detecting the rotational lifting operation, causing, with one or more processors, an image capture device of the electronic device to enter a video recording mode of operation.

By detecting the transition of the electronic device's housing to a wrapped geometry around the wrist, the system facilitates the seamless initiation of a video recording mode when the user performs a specific rotational lifting operation. This allows for intuitive control over the recording function, enhancing the user experience by enabling quick and natural transitions into video capture without the need for manual activation through touch or button presses.

The integration of at least two sensors to recognize both the wrapped geometry and the rotational lifting operation ensures that the video recording mode is activated only when the device is in the correct position and orientation. This minimizes accidental activation and provides a more reliable and user-friendly interaction with the device's camera features.

Utilizing the processors to respond to the combined input from the first and second sensors, the method ensures that the video recording mode is engaged in a contextually appropriate manner. This coordination between the device's physical configuration and the user's gesture promotes a more immersive and efficient video recording experience, particularly in scenarios where the user needs to quickly capture spontaneous moments.

Embodiments of the disclosure provide a solution for managing a gesture-based camcorder mode on an adaptive wearable display device. These embodiments leverage the unique form factor of the device, which can dynamically transform into different configurations, such as a wrist-worn accessory. By detecting specific user gestures, such as a rotational lifting operation, the device can initiate and control the video recording mode without the need for manual interaction.

The system utilizes a combination of sensors, including an inertial measurement units and flex sensors, to detect the device's form factor and the user's gestures accurately. This allows for a seamless and intuitive user experience, where the device automatically enters the video recording mode when it is worn on the wrist and the user performs the designated gesture.

During video recording, the adaptive display device intelligently manages the display to provide a dual-preview experience. If a person is detected in the camera's field of view, the device presents a real-time preview on both the internal and external portions of the display, allowing both the recorder and the subject to view the recording simultaneously. In the absence of a person in the field of view, the preview is limited to the internal portion of the display.

To ensure optimal video quality, in some embodiments the system trims the starting and ending segments of the recording, which may include unwanted blurriness caused by the device's spatial movement during the start and stop of the recording. This trimming process eliminates any undesired portions and ensures a clear and focused final video.

Embodiments of the disclosure provide a unique and innovative solution for managing a gesture-based camcorder mode on an adaptive wearable display device. By leveraging the device's form factor and utilizing intuitive gestures, the system enhances the user experience by enabling hands-free video recording and providing a dual-preview feature. These advancements make the device more user-friendly and practical for capturing memorable moments in various scenarios.

In one embodiment of the electronic device as described, the deformable housing may consist of a series of interconnected segments made from a durable polymer that allows for smooth transition between different configurations, such as a flat display mode to a wrapped, wrist-worn form. The flexible display, which conforms to the geometric configuration of the housing, could be an advanced OLED screen capable of high-resolution output and touch sensitivity, providing a seamless user interface experience in various modes of operation.

Another embodiment might feature a metallic linkage system within the deformable housing, offering a more robust structure for the electronic device. This could be particularly beneficial for users in active or outdoor environments where the device may be subjected to more rigorous use. The flexible display in this case could be constructed with a scratch-resistant and weatherproof material, ensuring durability and functionality in diverse conditions.

A further embodiment could integrate a dual-camera system in the electronic device, with one camera optimized for high-definition video recording and the other for capturing depth information or thermal imaging. This would allow the device to offer specialized recording modes, such as augmented reality or night vision, when entering the video recording mode of operation as the device is supported in the camcorder orientation.

In yet another embodiment, the electronic device could be designed with a focus on aesthetic customization, featuring a deformable housing with attachable decorative elements or interchangeable skins. The flexible display might also support dynamic theming, allowing the user interface to match the external appearance of the device, providing a personalized experience while maintaining the functionality of the video recording mode of operation.

Lastly, an embodiment could be envisioned where the electronic device is part of a larger ecosystem, capable of wirelessly connecting with other smart devices or home automation systems. In this scenario, the device could act as a remote control or a hub for other cameras and sensors when in the wrist-worn configuration, offering extended functionality beyond its standalone video recording capabilities.

Embodiments of the disclosure offer several advantages that enhance the user experience and functionality of the electronic device. These advantages include hands-free operation of the video recording mode, seamless transitions between different form factors, intuitive gesture-based controls, and the ability to provide a dual-preview experience. Furthermore, additional advantages will be described in more detail below, and it will be evident to those skilled in the art that further benefits and advantages can be derived from the teachings of this disclosure.

Turning now to FIG. 1, illustrated therein is one explanatory deformable electronic device 100 configured in accordance with one or more embodiments of the disclosure. The deformable electronic device 100 of FIG. 1 is a portable electronic device. In one or more embodiments, the deformable electronic device 100 includes a deformable link assembly 101 comprising a plurality of linkage members. In one or more embodiments, each linkage member includes a corresponding pivot member 103 that allow the deformable electronic device 100 to be selectively deformed by bending or folding. Advantageously, this allows the deformable electronic device 100 to function as an equivalent to multiple devices depending upon the amount of deformation of the deformable link assembly 101.

For example, the deformable electronic device 100 is shown in an undeformed configuration in which the deformable electronic device 100 is generally flat and substantially planar in FIG. 1. In such a configuration, the deformable electronic device 100 can function as a smartphone, palmtop computer, or tablet computer. However, as will be shown below with reference to FIG. 3, in another embodiment the deformable electronic device 100 can be folded into a tent geometric configuration, in a pad orientation, and can accordingly function as a table clock, content viewer, or auxiliary display when such a condition. It should be obvious to those of ordinary skill in the art having the benefit of this disclosure that the deformable electronic device 100 can function as other devices as a function of its physical geometry, including as a gaming device, a media player, or other device.

This illustrative deformable electronic device 100 includes a display 102, which may optionally be touch-sensitive. In one embodiment where the display 102 is touch-sensitive, the display 102 can serve as a primary user interface of the deformable electronic device 100. Users can deliver user input to the display 102 of such an embodiment by delivering touch input from a finger, stylus, or other objects disposed proximately with the display.

In one embodiment, the display 102 is configured as an organic light emitting diode (OLED) display fabricated on a flexible plastic substrate. However, it should be noted that other types of displays would be obvious to those of ordinary skill in the art having the benefit of this disclosure.

In one or more embodiments, an OLED is constructed on flexible plastic substrates can allow the display 102 to become a flexible display 105 in one or more embodiments with various bending radii. For example, some embodiments allow bending radii of between thirty and six hundred millimeters to provide a bendable display. Other substrates allow bending radii of around five millimeters to provide a display that is foldable through active bending. Other flexible displays 105 can be configured to accommodate both bends and folds. In one or more embodiments the flexible display 105 may be formed from multiple layers of flexible material such as flexible sheets of polymer or other materials.

The explanatory deformable electronic device 100 of FIG. 1 also includes a deformable link assembly 101 comprised of a plurality of linkage members. In one or more embodiments, each linkage member includes one or more pivot members 103. Explanatory operation of one or more embodiments of the deformable link assembly 101 is described in commonly assigned U.S. patent application Ser. No. 18/213,679, filed Jun. 23, 2023, entitled "Deformable Electronic Devices and Methods for Constructing the Same," which is incorporated by reference herein for all purposes.

The pivot members 103, which each include a pivot shaft having its central axis aligned substantially parallel with the surface defined by the display 102, and which each engage a plurality of links that are interleaved in an overlapping arrangement, allow portions of the deformable link assembly 101 to pivot about each linkage member so that the deformable electronic device 100 becomes bendable and/or foldable.

In one or more embodiments, a flexible substrate is situated beneath the display 102. In one or more embodiments, the flexible substrate provides intermediary support structure between the display 102 and the deformable link assembly 101.

In the illustrative embodiment of FIG. 1, the display 102 abuts a major surface of the flexible substrate on an opposite side of the flexible substrate relative to the deformable link assembly 101. In one embodiment, the lower surface of the display 102, or another layer in the mechanical stack-up of the display 102, can be adhered to the flexible substrate on one side of the flexible substrate while the deformable link assembly 101, or alternatively to portions of the deformable link assembly 101, are adhered to the other side of the flexible substrate. In this illustrative embodiment, the display 102 also spans the pivot members 103 of each linkage member. In this illustrative embodiment, the display 102 is flexible so as to deform when the deformable link assembly 101 bends around the pivot members 103.

Features can be incorporated into the deformable electronic device 100. Examples of such features include an optional image capture device 104 or an optional speaker port 129. A user interface component, which may be a button or touch sensitive surface, can also be disposed along a side of an electronic circuit component housing 106. The deformable electronic device 100 can also include one or more connectors 107, which can be an analog connector, a digital connector, or combinations thereof.

A block diagram schematic 110 of the deformable electronic device 100 is also shown in FIG. 1. The block diagram schematic 110 can be configured as a printed circuit board assembly disposed within the electronic circuit component housing 106. Various components can be electrically coupled together by conductors, or a bus disposed along one or more printed circuit boards. A flexible substrate can then span the pivot members 103 to electrically couple electronic circuits situated in the electronic circuit component housing 106 to other components situated within another electronic circuit component housing 127, wherein included, together.

In one or more embodiments, the deformable electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the deformable electronic device 100. Each of the application processor and the auxiliary processor(s) can be configured to process and execute executable software code to perform the various functions of the deformable electronic device 100. A storage device, such as memory 113, can optionally store the executable software code used by the one or more processors 112 during operation.

In this illustrative embodiment, the deformable electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications such as HomeRF, Bluetooth and IEEE 802.11, and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the deformable electronic device 100. For example, in one embodiment the one or more processors 112 comprise one or more circuits operable with one or more user interface devices, which can include the display 102, to present, images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the deformable electronic device 100. The operating system environment can include a kernel and one or more drivers, and an application service layer, and an application layer. The operating system environment can be configured as executable code operating on one or more processors or control circuits of the deformable electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the deformable electronic device 100 optionally includes one or more magnet magnetometer pairs 120, operable with the one or more processors 112, to detect a bending operation that causes the deformable link assembly 101 to deform, thereby transforming the deformable electronic device 100 into a deformed geometry, such as that shown in FIGS. 2-7. In one or more embodiments, each magnet magnetometer pair 120 is situated in a linkage member of the plurality of linkage members defining the deformable link assembly 101 such that the magnetometer of each magnet magnetometer pair 120 is situated in a linkage member of the plurality of linkage members and at least one corresponding magnet is situated in another linkage member of the plurality of linkage members that is adjacent to the linkage member in which the magnetometer is situated.

Illustrating by example, if a magnet of one magnet magnetometer pair 120 is situated in linkage member 126, at least one corresponding magnet may be situated in linkage member 128, which is adjacent to linkage member 126. This adjacent positioning of the magnetometer and corresponding magnet of each magnet magnetometer pair 120 allows the one or more processors 112 to identify a deformed geometric configuration of the deformable electronic device 100 from signals received from the magnetometers of the magnet magnetometer pairs 120.

In the illustrative embodiment of FIG. 1, the magnet magnetometer pairs 120 comprise at least three magnet magnetometer pairs. Moreover, in one or more embodiments each magnet magnetometer pair is separated from each other magnet magnetometer pair by at least one linkage member of the plurality of linkage members defining the deformable link assembly 101.

However, more magnet magnetometer pairs 120 can be added as well. For instance, in other embodiments, every linkage member of the deformable link assembly 101 can include either a magnet or a magnetometer of a magnet magnetometer pair 120. Thus, it should be understood that embodiments of the disclosure can have as few as one magnet magnetometer pair 120 or as many as the number of linkage members.

In the illustrative embodiment of FIG. 1, the plurality of linkage members defining the deformable link assembly 101 comprises at least fifteen linkage members. Like the number of magnet magnetometer pairs 120, this number can vary as well. Increasing the number of linkage members allows for tighter bending radii, while decreasing the number of linkage members simplifies the design and reduces the part count necessary to construct the deformable electronic device 100.

In one or more embodiments at least some of the linkage members of the plurality of linkage members defining the deformable link assembly 101 house one or more rechargeable electrochemical cells. In the illustrative embodiment of FIG. 1, each linkage member of the plurality of linkage members defining the deformable link assembly 101 houses a rechargeable electrochemical cell pair.

In one or more embodiments, the magnetometer of odd instances of the linkage members housing the rechargeable electrochemical cell pairs is situated between a first pair of rechargeable electrochemical cells situated within the odd instances of the linkage members housing the rechargeable electrochemical cell pairs. The corresponding magnets of the magnet magnetometer pair 120 of even instances of the linkage members housing the rechargeable electrochemical cell pairs is then situated between a second pair of rechargeable electrochemical cells situated within the even instances of the linkage members housing the rechargeable electrochemical cell pairs.

This "between the cells" positioning of the magnet or magnetometer of each magnet magnetometer pair 120 allows for the determination of a wide range of deformable geometric configurations while using only a small number of magnet magnetometer pairs 120. However, in other embodiments, either the magnetometers or magnets can be situated outside the rechargeable electrochemical cell pairs as well. Other configurations will be obvious to those of ordinary skill in the art having the benefit of this disclosure.

Accelerometers 125 can be used in conjunction with the magnet magnetometer pairs 120. Illustrating by example, a first accelerometer can be positioned in the electronic circuit component housing 106, while a second accelerometer is situated within another electronic circuit component housing 127. In this illustrative embodiment, the electronic circuit component housing 106 is situated to one side of the plurality of linkage members defining the deformable link assembly 101, while the other electronic circuit component housing 127 is situated to another side of the plurality of linkage members defining the deformable link assembly 101.

In one or more embodiments, the one or more processors 112 can use the magnet magnetometer pairs 120 to detect a deformed or undeformed state of the deformable electronic device 100 and can then use the accelerometers 125 to distinguish orientations of those geometric configurations. Illustrating by example, in one or more embodiments the one or more processors 112 are configured to distinguish between the L pad geometric configuration and the L stand geometric configuration, or alternatively between the tent pad geometric configuration and the tent lean back geometric configuration, using signals received from the first accelerometer and the second accelerometer. Techniques for doing this will be described below with reference to FIG. 18. Others will be obvious to those of ordinary skill in the art having the benefit of this disclosure.

In one embodiment, the one or more processors 112 may generate commands or execute control operations based on information received from the various sensors, including the one or more magnet magnetometer pairs 120, the accelerometers 125, the user interface, or the other sensors 121. The one or more processors 112 may also generate commands or execute control operations based upon information received from a combination of the one or more magnet magnetometer pairs 120, the accelerometers 125, the user interface, or the other sensors 121. Alternatively, the one or more processors 112 can generate commands or execute control operations based upon information received from the one or more magnet magnetometer pairs 120 and the accelerometers 125 alone. Moreover, the one or more processors 112 may process the received information alone or in combination with other data, such as the information stored in the memory 113.

In one or more embodiments, the one or more processors 112 are also operable to actuate the image capture device 104 under certain conditions. Illustrating by example, in one or more embodiments the one or more processors 112 can execute a method that actuates the image capture device 104 in the electronic device 100 that causes the image capture device 104 to capture visual content such as images and videos.

In one or more embodiments, the image capture device 104 comprises of one or more cameras with various recording modes, including a video recording mode. In one or more embodiments, the one or more processors 112 control the image capture device 104, thereby instructing it to enter or exit the video recording mode based on specific detected conditions. This actuation capability allows the electronic device 100 to function like a camcorder when it is wrapped around a user's wrist in a specific geometric form factor, and optionally lifted into a camcorder support condition.

In one or more embodiments, one or more sensors 121 are embedded within the electronic device 100 and are configured to detect a variety of conditions and inputs. These sensors may include, but are not limited to, accelerometers, gyroscopes, magnetometers, proximity sensors, and flex sensors, which can include the magnet magnetometer pairs 120.

In one or more embodiments, the one or more sensors 121 can be capable of detecting the wrapped geometric form factor defined by the flexible display 102 supported by a deformable housing, which is indicative of the electronic device 100 being worn on the user's wrist. Additionally, the one or more sensors 121 can be operable to detect gesture input that indicates a camcorder support condition is supporting the electronic device 100 in three-dimensional space while the wrapped geometric form factor is occurring. This detection is then used, in one or more embodiments, to enable the image capture mode of operation of the image capture device 104.

The one or more processors 112, which can serve as the central processing unit(s) of the electronic device 100, execute instructions and coordinating the operations of various components, examples of which can be stored as modules 116 within the memory 113. The one or more processors 112 are operable with the one or more sensors 121 to process the detected conditions, such as the wrapped, wrist-worn geometric configuration and the camcorder orientation in three-dimensional space.

Upon detecting these conditions, in one or more embodiments the one or more processors 112 enable the image capture mode of operation of the image capture device 104. The one or more processors 112 can also be responsible for managing the transition into and out of the video recording mode of operation, ensuring that the electronic device 100 captures video content when the user intends to record by performing specific gestures.

In one or more embodiments, the one or more sensors 121 identify a wrist-worn condition of the wrapped geometric form factor, wherein the enabling of the video recording mode of operation occurs only when the wrist-worn condition is occurring. This ensures that the electronic device 100 enters the image capture mode specifically when the device is in the appropriate form factor and orientation, as intended by the user's gestures. The one or more processors 112, in response to detecting the wrapped geometric form factor and the camcorder support condition, enable an image capture mode of operation of the image capture device 104, which may include a video recording mode of operation.

In one or more embodiments, the electronic device 100 comprises the deformable housing, the flexible display 102, one or more sensors to detect a wrapped geometry, such as those defined by magnet magnetometer pairs 120, one or more other sensors 121, an image capture device 104, and one or more processors 112. In one or more embodiments, the deformable housing includes a plurality of linkage members found in a deformable link assembly 101 and supports the flexible display 102. This deformable link assembly 101 allows the flexible display 102 to maintain a wrapped, wrist-worn geometric configuration, one example of which will be described below with reference to FIG. 8. This configuration is detectable by the one or more sensors defined by magnet magnetometer pairs 120, which are operable to determine when the electronic device 100 assumes the wrapped geometric form factor indicative of being worn on a user's wrist.

The flexible display 102, supported by the deformable housing, is capable of presenting visual content and can be manipulated into various geometric configurations to suit different use cases. The flexible display 102 enables the electronic device 100 to function in a camcorder orientation when the device is supported in three-dimensional space. The one or more sensors defined by magnet magnetometer pairs 120 work in conjunction with the flexible display 102 to facilitate the detection of the electronic device's geometric configuration.

The one or more other sensors 121 are operable to detect when the electronic device 100 is supported in a camcorder orientation in three-dimensional space. These sensors 121 may include accelerometers, gyroscopes, and other motion-detecting components that can sense the orientation and movement of the electronic device 100 relative to the user's body and the surrounding environment.

The image capture device 104 is a component of the electronic device 100 that is responsible for capturing visual content, such as photos and videos. The image capture device 104 is activated, in one or more embodiments, and enters a video recording mode of operation in response to the electronic device 100 being supported in the camcorder orientation while the electronic device 100 is in the wrapped, wrist-worn geometric configuration. This mode of operation is facilitated by the one or more processors 112, which work in concert with the one or more sensors defined by magnet magnetometer pairs 120 and the one or more other sensors 121.

The one or more processors 112 are operable with the one or more sensors defined by magnet magnetometer pairs 120, the one or more other sensors 121, and the image capture device 104. The one or more processors 112 are operable to cause the image capture device 104 to enter a video recording mode of operation in response to the electronic device 100 being supported in the camcorder orientation while the electronic device 100 is in the wrapped, wrist-worn geometric configuration.

Furthermore, the one or more processors 112 are operable to cause the image capture device 104 to cease the video recording mode of operation when the electronic device 100 ceases to be either supported in the camcorder orientation or in the wrapped, wrist-worn geometric configuration. Additionally, the one or more processors 112 are operable to crop video segments captured by the image capture device 104 while in the video recording mode of operation while the electronic device 100 is moving into the camcorder orientation in three-dimensional space.

The one or more other sensors 121 may further include a microphone, an earpiece speaker, a second loudspeaker, and a user interface component such as a button or touch-sensitive surface. The one or more other sensors 121 may include one or more of an accelerometer, gyroscope, image capture device, and/or display touch sensors to determine whether the deformable electronic device 100 is being held by a first side or a second side in a portrait mode.

The one or more other sensors 121 may also include key selection sensors, proximity sensors, a touch pad sensor, a touch screen sensor, a capacitive touch sensor, and one or more switches. Touch sensors may be used to indicate whether any of the user actuation targets present on the display 102 are being actuated. Alternatively, touch sensors disposed in the deformable electronic device 100 can be used to determine whether the deformable electronic device 100 is being touched at side edges or major faces of the deformable link assembly 101. The touch sensors can include surface and/or housing capacitive sensors in one embodiment. The other sensors 121 can also include audio sensors and video sensors (such as a camera).

The other sensors 121 can also include motion detectors, such as one or more accelerometers or gyroscopes. For example, an accelerometer may be embedded in the electronic circuitry of the deformable electronic device 100 to show vertical orientation, constant tilt and/or whether the deformable electronic device 100 is stationary. A gyroscope can be used in a similar fashion.

Other components 122 operable with the one or more processors 112 can include output components such as video outputs, audio outputs, and/or mechanical outputs. Examples of output components include audio outputs such as speaker port 129, earpiece speaker, or other alarms and/or buzzers and/or a mechanical output component such as vibrating or motion-based mechanisms. Still other components will be obvious to those of ordinary skill in the art having the benefit of this disclosure.

In one or more embodiments, the deformable electronic device 100 comprises a plurality of energy storage devices 123. In one or more embodiments, each energy storage device of the plurality of energy storage devices 123 comprises a rechargeable electrochemical cell. In one or more embodiments, the plurality of energy storage devices 123 include a pair of energy storage devices situated in each linkage member of the plurality of linkage members defining the deformable link assembly 101.

In one or more embodiments, each pair of energy storage devices of the plurality of energy storage devices 123 situates in a corresponding linkage member on a one-to-one basis, with a pair of energy storage devices 123 situated within a corresponding linkage member. In other embodiments, a single energy storage device of the plurality of energy storage devices 123 situates in a corresponding linkage member on a one-to-one basis. In still other embodiments, only some of the linkage members of the plurality of linkage members defining the deformable link assembly 101 will house energy storage devices. Other configurations will be obvious to those of ordinary skill in the art having the benefit of this disclosure.

In the illustrative embodiment of FIG. 1, the plurality of energy storage devices 123 are situated on a rear side of the flexible substrate supporting the display 102. In this example, the plurality of energy storage devices 123 are situated between the electronic circuit component housing 106 to other components situated within another electronic circuit component housing 127. In one or more embodiments, each pair of energy storage devices of the plurality of energy storage devices 123 substantially spans a width of the deformable electronic device.

Each energy storage device of the plurality of energy storage devices 123 can take a variety of forms. In an illustrative embodiment, each energy storage device of the plurality of energy storage devices 123 can comprise an electrochemical cell, which is optionally rechargeable. For instance, the plurality of energy storage devices 123 can each comprise a lithium-ion, lithium-polymer, or other type of rechargeable cell. Other examples of energy storage devices suitable for use with embodiments of the disclosure will be obvious to those of ordinary skill in the art having the benefit of this disclosure. For instance, in other embodiments the plurality of energy storage devices 123 may be a supercapacitor, and so forth.

In one or more embodiments, a first pair of energy storage devices is situated in a first linkage member, with a second pair of energy storages device situated in a second linkage member, and so forth. In one or more embodiments, an electrical conductor couples the energy storage devices of the plurality of energy storage devices 123 together and/or to the one or more processors 112.

Charging circuitry 124 can be included to selectively individual, subsets, or all of the plurality of energy storage devices 123 when depleted. In one or more embodiments, the charging circuitry 124 comprises a charging node that is coupled to each energy storage device of the plurality of energy storage devices 123.

In one or more embodiments, the charging circuitry 124 includes a switch that is electrically coupled between the conductor coupling the plurality of energy storage devices 123. Opening the switch disconnects the conductor from the plurality of energy storage devices 123, while closing the switch couples the plurality of energy storage devices 123 to the components of the block diagram schematic 110.

It is to be understood that FIG. 1 is provided for illustrative purposes only and for illustrating components of one deformable electronic device 100 in accordance with embodiments of the disclosure and is not intended to be a complete schematic diagram of the various components required for an electronic device. Therefore, other deformable electronic devices in accordance with embodiments of the disclosure may include various other components not shown in FIG. 1 or may include a combination of two or more components or a division of a particular component into two or more separate components, and still be within the scope of the present disclosure.

A user can perform a bending operation upon the deformable electronic device 100. For example, a user can apply force at the first end 108 and the second end 109 of the deformable electronic device 100 to pivot linkage members of the deformable link assembly 101 relative to other linkage members of the deformable link assembly 101. This method of deforming the deformable link assembly 101 allows the user to simply and quickly bend the deformable electronic device 100 into a desired geometric configuration. Examples of common geometric configurations include an L geometric configuration, a tent geometric configuration, a hook geometric configuration, and a wrapped geometric configuration. Others will be obvious to those of ordinary skill in the art having the benefit of this disclosure.

In other embodiments, rather than relying upon the manual application of force, the deformable electronic device 100 can include a mechanical actuator to deform the deformable link assembly 101 around the pivot members 103 of each linkage member. For example, a motor or other mechanical actuator can be operable with structural components to deform the deformable link assembly 101 around the pivot members 103 of the linkage members to predetermined angles or geometric alignments in one or more embodiments. The inclusion of a mechanical actuator allows a precise bend angle to be repeatedly achieved without the user having to make adjustments in attempting to achieve the same. However, as the inclusion of a mechanical actuator can increase cost, in other embodiments this component will be omitted.

It should be noted that in one or more embodiments, the display 102 has a compliance coefficient that can be used advantageously to help counter the bending operation. Illustrating by example, when the bending operation transforms the deformable electronic device 100 to a bent configuration, one example of which is shown below with reference to FIG. 3, in one or more embodiments the mechanical layers of the display 102 are loaded by the bending operation and work to bias portions of the deformable link assembly 101 back to the open position of FIG. 1.

Moreover, in one or more embodiments a thin stainless-steel plate (approximately 0.04 millimeters in thickness) forms one layer of the display 102 and will increase the loading. This mechanical loading of the layers of the display 102 can be used to help the user transform the deformable electronic device 100 from folded or partially folded configurations to unfolded configurations in one or more embodiments. The modulus of the display 102 can range from 40-300 giga-Pascals in one or more embodiments.

Regardless of whether the bending operation is a manual one or is instead one performed by a mechanical actuator, it results in the display 102 being deformed by one or more bends about the linkage members. Turning now to FIGS. 2-7, illustrated therein are three illustrative results of bending operations.

Figures 2, 3, 4:
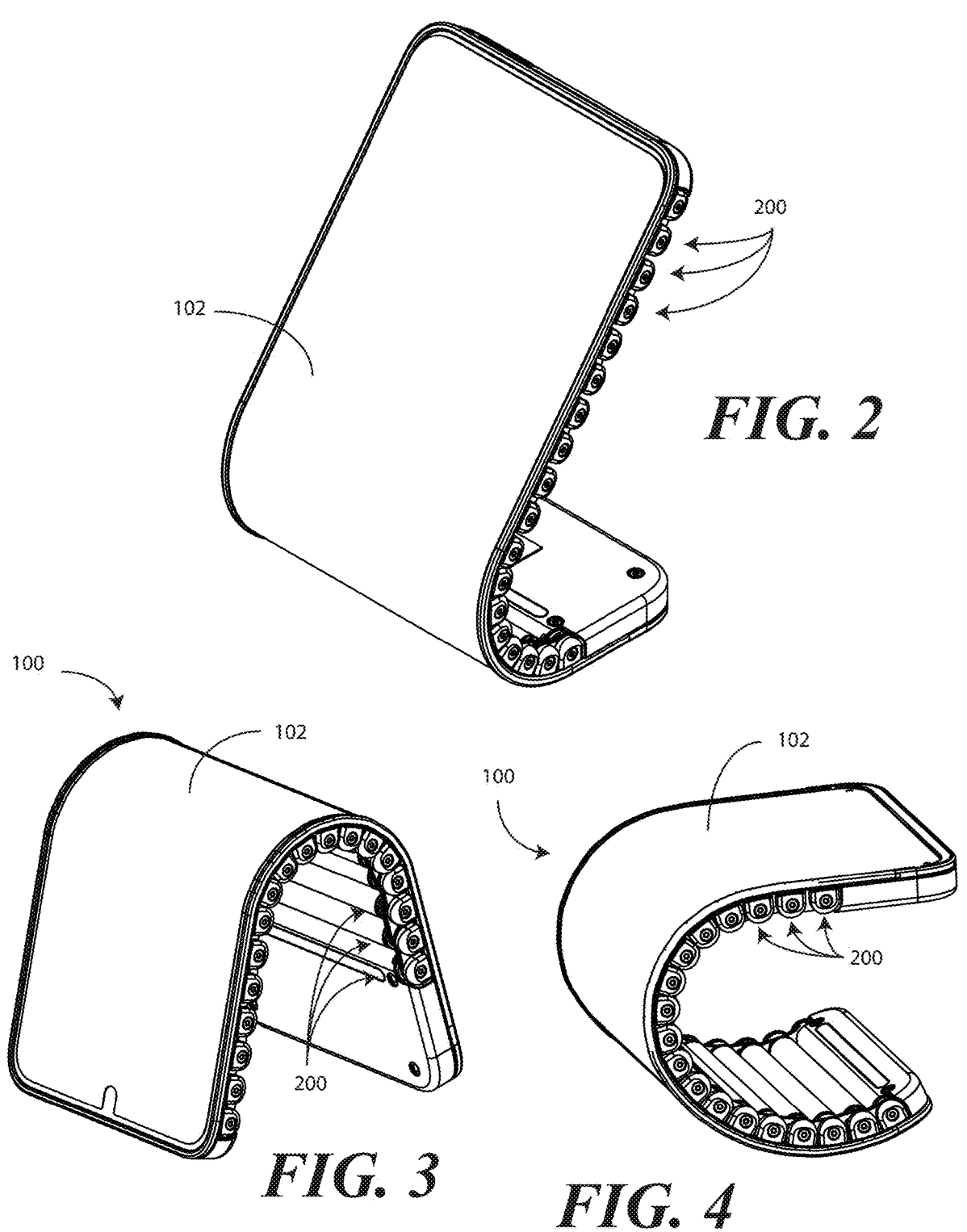
FIG. 2 illustrates one explanatory deformable electronic device in accordance with one or more embodiments of the disclosure when in a deformed to a "L stand" geometric configuration.
FIG. 3 illustrates one explanatory deformable electronic device in accordance with one or more embodiments of the disclosure when in a deformed to a "tent pad" geometric configuration.
FIG. 4 illustrates one explanatory deformable electronic device in accordance with one or more embodiments of the disclosure when in a deformed to a "wrap" geometric configuration.

In the illustrative embodiment of FIG. 2, the deformable electronic device 100 has been deformed into an L-shape geometric configuration. Additionally, the L-shape geometric configuration has been placed on a table or other flat surface such that the minor planar surface of display 102 defining the "L" abuts the surface. This is known as a "L stand" geometric configuration, with the deformable electronic device 100 having a single bend. This bent configuration can make the display 102 easier for the user to view since they do not have to hold the deformable electronic device 100 in their hands.

In this illustrative embodiment, the display 102 has a single bend about the linkage members 200. However, in other embodiments, the display 102 can be deformed with a plurality of bends about the linkage members 200. Other configurations will be obvious to those of ordinary skill in the art having the benefit of this disclosure.

In one embodiment, the one or more processors (112) of the deformable electronic device 100 are operable to detect that a bending operation is occurring from signals from the magnetometers of the magnet magnetometer pairs (120). Said differently, in one or more embodiments the one or more processors (112) are configured to determine whether the deformable electronic device 100 is deformed, and into what geometric configuration, from signals from the magnetometers of the magnet magnetometer pairs (120). This can be done in conjunction with other signals from the accelerometers (125).

Figures 5, 6, 7:
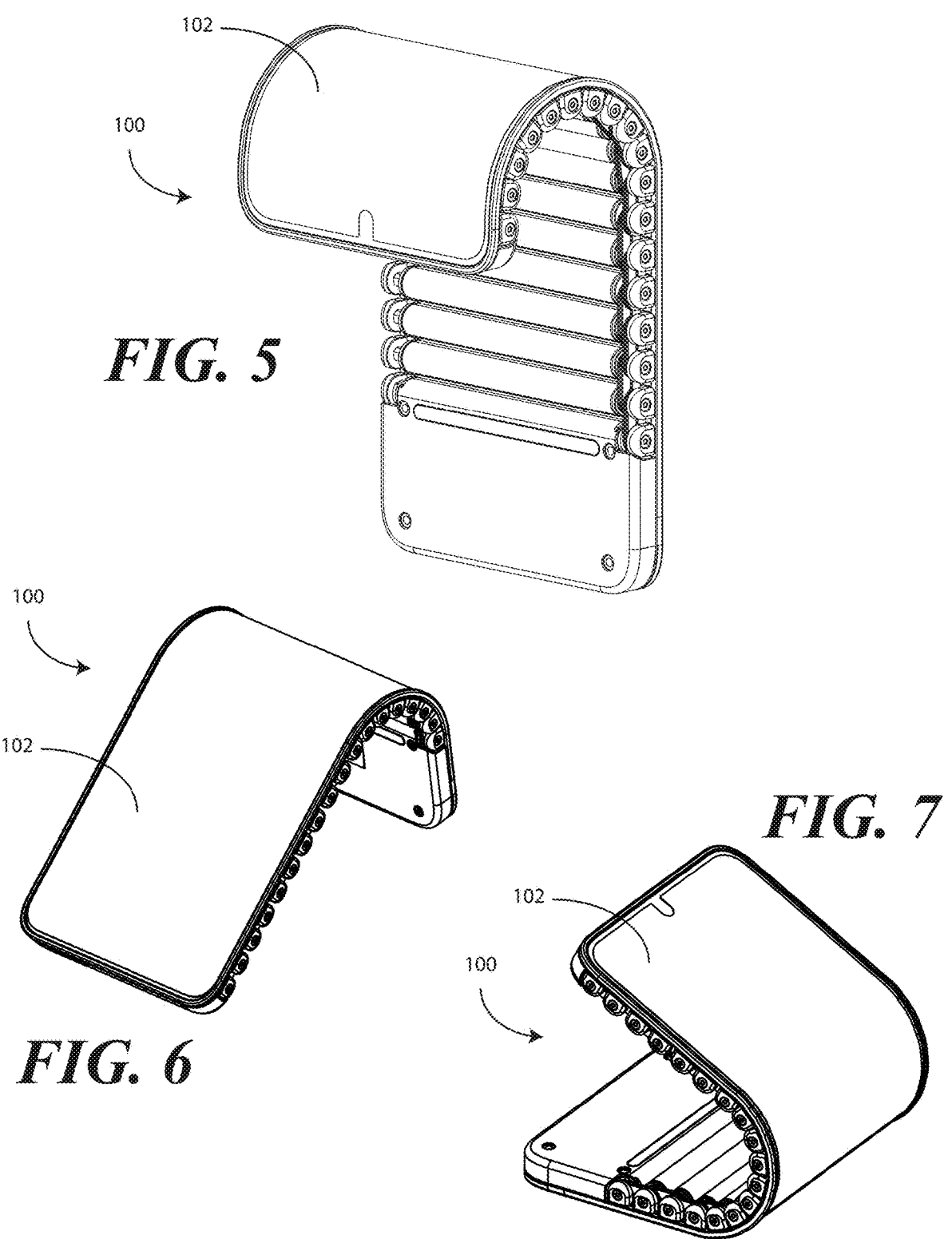
FIG. 5 illustrates one explanatory deformable electronic device in accordance with one or more embodiments of the disclosure when in a deformed to a "hook" geometric configuration.
FIG. 6 illustrates one explanatory deformable electronic device in accordance with one or more embodiments of the disclosure when in a deformed to a "L pad" geometric configuration.
FIG. 7 illustrates one explanatory deformable electronic device in accordance with one or more embodiments of the disclosure when in a deformed to a "tent lean back" geometric configuration.

Where, for instance, the deformable electronic device 100 comprises a first accelerometer situated to one side of the plurality of linkage members and a second accelerometer situated to a second side of the plurality of linkage members, the one or more processors (112) are configured to determine, when the deformable electronic device 100 is deformed as shown in FIG. 2, whether the deformable electronic device 100 is in a pad orientation (the deformable electronic device 100 is shown in a L pad geometric configuration in FIG. 6), a stand orientation, or, in the case of tent folds such as that shown in FIG. 3, whether the deformable electronic device 100 is in a tent pad orientation (shown in FIG. 3) or a tent lean back orientation (the deformable electronic device 100 is shown in a tent lean back geometric configuration in FIG. 7).

In FIG. 2, the one or more processors (112) are operable to determine the deformable electronic device 100 is in a L stand configuration from signals from the magnet magnetometer pair (120) and other signals from the accelerometers (125). The one or more processors (112) can detect other geometric configurations of the deformable electronic device 100 as well, one example of which is the hook geometric configuration shown in FIG. 5.

In one or more embodiments, the one or more processors (112) can partition the display 102 of the deformable electronic device 100 as another function of the geometric alignment of the deformable link assembly (101) resulting from the bending operation. For example, in the illustrative embodiment of FIG. 2 the display 102 has been partitioned into a first portion that is visible and a second portion (facing into the surface upon which the deformable electronic device 100 rests), with each portion being disposed on opposite sides of the stand bend. In one or more embodiments, the one or more processors (112) can detect a bend amount as well using the magnet magnetometer pairs (120) and/or accelerometers (125).

In one or more embodiments, the one or more processors (112) of the electronic device are operable to, when the display 102 is deformed by one or more bends, present a first image on a first portion of the display 102, while presenting a second image on a second portion of the display 102. If, for example, the deformable electronic device 100 were turned such that the first end (108) and the second end (109) were resting on the surface, which is known as a "pad" orientation, and which is shown in FIG. 6, the deformable electronic device 100 would resemble an offset tent with a first portion of the display 102 visible from a first side of the bend and a second portion of the display 102 visible from a second side of the bend.

When the bend is made in the middle, rather than in an offset location such as that shown in FIG. 2, the L geometric configuration transforms to a "tent" geometric configuration. One example of such a tent geometric configuration is shown in FIG. 3. As shown in FIG. 3, the deformable electronic device 100 has been bent further to resemble a playing card bent into a "tent" configuration. The tent configuration of FIG. 3 is in a "pad" orientation because the first end (108) and the second end (109) of the deformable electronic device 100 are resting on a surface. This "tent pad" geometric configuration makes the display 102 easier to see from above.

FIG. 4 illustrates the deformable electronic device 100 when deformed into a "wrapped" geometric configuration. When in the wrapped geometric configuration, the deformable electronic device 100 can even be worn on a wrist. When worn on a wrist, the wrapped geometric configuration becomes a wrist-worn wrapped geometric configuration. Whether the electronic device 100 is positioned on a wrist can be determined with touch sensors situated along the deformable housing.

In one or more embodiments, the wrapped geometric configuration can be configured with different radii to accommodate different size wrists. In one or more embodiments, the deformable electronic device 100 can be deformed into at least six different wrapped geometric configurations, each having a smaller radius than the one before to accommodate smaller and smaller wrists.

In one or more embodiments, the plurality of linkage members 200 define a multi-link hinging mechanism for the deformable electronic device 100. In FIGS. 1-7 the linkage members 200 are all similarly configured with links separating each pivot member (103) from another. The linkage members 200 defining the deformable link assembly 101 are attached to a rear major face of the flexible substrate supporting the display 102.

Figure 8:
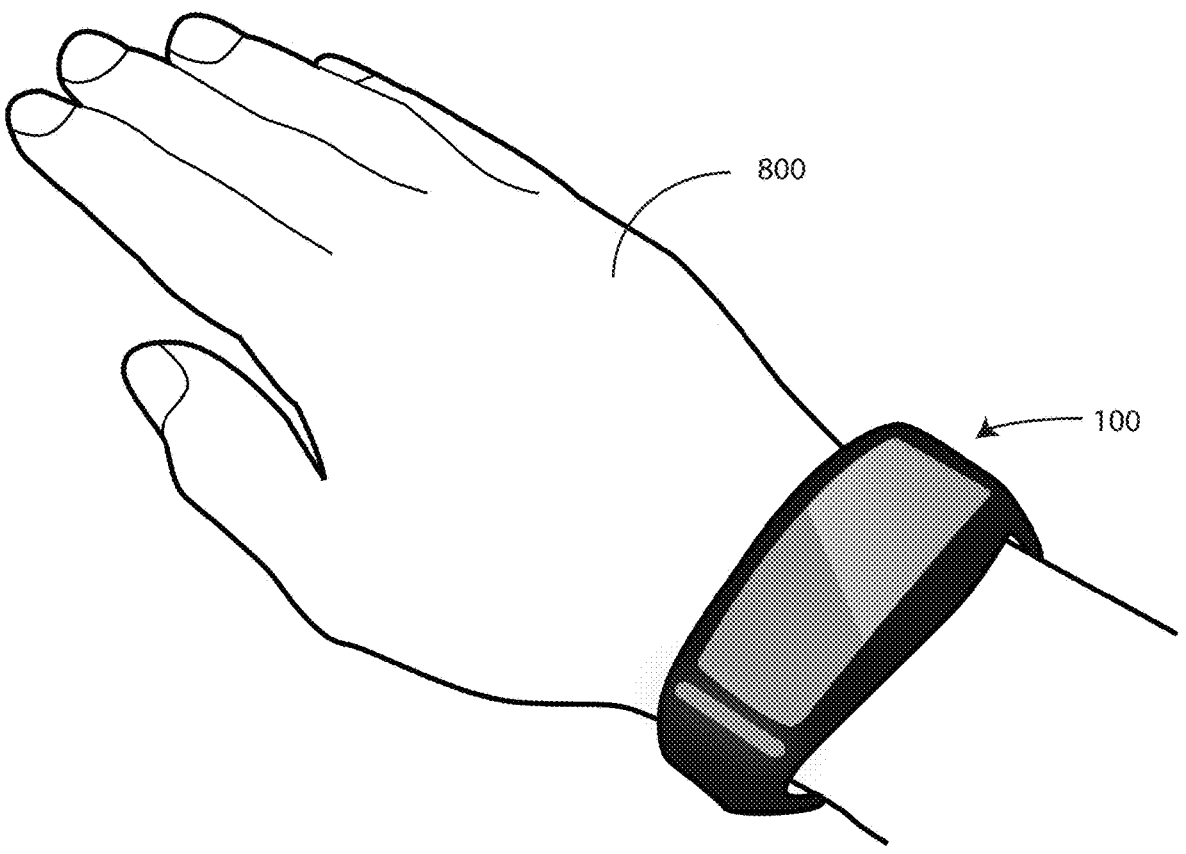
FIG. 8 illustrates one explanatory electronic device in accordance with one or more embodiments of the disclosure in a wrapped geometric form factor while being worn on the wrist of a user.

Turning now to FIG. 8, illustrated therein is a user, identified as user 800, wearing an explanatory electronic device 100 configured in accordance with one or more embodiments of the disclosure on their wrist while in a wrapped geometric form factor. The electronic device 100 is shown in a wrapped geometric configuration, specifically designed to be worn comfortably on the user's wrist. This configuration allows the electronic device 100 to adapt to the shape of the wrist, providing a secure and ergonomic fit.

To detect the wrist-worn wrapped geometric configuration, the electronic device 100 is equipped with one or more sensors. These sensors are strategically placed within the device to capture and analyze data related to the device's position and orientation. By monitoring the data from these sensors, one or more processors (112) of the electronic device 100 can determine if it is being worn on the user's wrist in the intended wrapped configuration.

One way the sensors can detect the wrist-worn wrapped geometric configuration is by utilizing magnet magnetometer pairs (120). These pairs of sensors can measure the magnetic field strength and orientation, allowing the electronic device 100 to detect the specific arrangement of the device's components when wrapped around the wrist. By analyzing the magnetic field data, the electronic device 100 can confirm that it is in the desired wrapped configuration.

Additionally, other sensors (121) integrated into the electronic device 100 can contribute to detecting the wrist-worn wrapped geometric configuration. For example, accelerometers and gyroscopes can sense the device's movement and orientation in three-dimensional space. By analyzing the data from these sensors, the device can determine if it is in the appropriate position and orientation to be considered in the wrapped configuration on the user's wrist.

Overall, the combination of magnet-magnetometer pairs and other sensors allows the electronic device 100 to accurately detect and confirm the wrist-worn wrapped geometric configuration. This ensures that the device enters the desired mode of operation, such as the video recording mode, when it is securely and comfortably worn on the user's wrist.

Embodiments of the disclosure contemplate that users will want to capture images and videos using the electronic device 100 while in the wrist-worn, wrapped geometric form factor. Advantageously, embodiments of the disclosure provide a method for detecting, using one or more processors, a wrapped geometric form factor defined by the flexible display and deformable housing of the electronic device 100. One or more other sensors then detect gesture input indicating a camcorder support condition is supporting the electronic device 100 in three-dimensional space while the wrapped geometric form factor is occurring. In one or more embodiments, one or more processors of the electronic device 100 then enable, in response to detecting the wrapped geometric form factor and camcorder support condition, an image capture mode of operation of an image capture device.

Figure 9:
FIG. 9 illustrates one explanatory method in accordance with one or more embodiments of the disclosure.

Turning now to FIG. 9, illustrated therein is one such method. Embodiments of the disclosure contemplate that when the electronic device 100 is in the wrist-worn, wrapped geometric form factor, a user can move their arm as if they were using an "old-style" camcorder in a grip and can use the image capture device (104) situated on the exterior side of the deformable housing in a camcorder mode of operation.

Beginning at step 901, a user 800 is holding an electronic device 100 configured in accordance with one or more embodiments of the disclosure. As previously described, the electronic device 100 comprises a deformable housing having a plurality of linkage members, a flexible display supported by the deformable housing, one or more sensors operable to determine the wrist-worn, wrapped geometric form factor of the electronic device 100, and one or more sensors operable to detect when the electronic device 100 is supported in a camcorder orientation in three-dimensional space. The electronic device 100 also includes an image capture device and one or more processors operable with the one or more sensors, the one or more other sensors, and the image capture device.

At step 902, the one or more sensors determine that the wrist-worn, wrapped geometric form factor of the electronic device 100 is occurring. At step 903, the user 800 transitions the electronic device 100 in three-dimensional space toward a camcorder support condition. At step 904, one or more sensors of the electronic device 100 detect this gesture input 908 indicating that the electronic device 100 is being transitioned to a camcorder support condition, as shown at step 906. At step 905, one or more processors of the electronic device 100 enable, in response to detecting the wrapped geometric form factor at step 902 and the camcorder support condition occurring at step 906, an image capture mode of operation of an image capture device of the electronic device.

In one or more embodiments, the image capture mode of operation comprises a video recording mode of operation of an image capture device of the electronic device. Thus, in one or more embodiments at step 905, the one or more processors operable with the one or more sensors, the one or more other sensors, and the image capture device, cause the image capture device to enter a video recording mode of operation in response to the electronic device being supported in the camcorder orientation while the electronic device is in the wrapped, wrist-worn geometric configuration. In one or more embodiments, this actuation of the image capture device at step 905 occurs only when the wrist-worn condition shown at step 901 is occurring, as determined at step 902.

Thus, as shown in FIG. 9, the user 800 has delivered a gesture input 908 to the electronic device 100 by performing a lifting operation lifting the electronic device 100 from a first position, shown at step 901, to a second position in three-dimensional space, which is shown at step 906. At step 902, one or more sensors of the electronic device 100 detect the wrist-worn, wrapped geometric form factor, while the one or more other sensors detect the gesture input at step 904 that indicates that electronic device 100 is now wrapped about the wrist of the user 800 while the arm is in the camcorder support condition in three-dimensional space while the wrapped geometric form factor is occurring. At step 905, one or more processors of the electronic device 100, in response to detecting the wrapped geometric form factor and the camcorder support condition, enable a video recording mode of operation of the image capture device.

As shown in FIG. 9, embodiments of the disclosure provide an electronic device 100 that is geometrically deformable. In one or more embodiments, at least a first sensor detects a deformable housing of the electronic device being transitioned into a wrapped geometry about a wrist at step 902. At least a second sensor detects a rotational lifting operation provided by the gesture input 908 in three-dimensional space at step 904. In one or more embodiments, in response to the at least a first sensor detecting the wrapped geometry about the wrist at step 902 and the at least a second sensor detecting the rotational lifting operation at step 904, the one or more processors cause, at step 905, an image capture device of the electronic device 100 to enter a video recording mode of operation.

As can be seen by comparing step 902 and step 906, in this illustrative embodiment the lifting operation causes a rotation of the electronic device 100 in the three-dimensional space by at least ninety degrees. Moreover, as can be seen at step 906, this lifting operation causes a gravity direction 907 to pass through a loop defined by the wrapped geometry. Said differently, in one or more embodiments the video recording mode of operation is actuated when the gravity direction 907 passes through a width 909 of the deformable housing.

Other operations can be performed at step 905 as well. Illustrating by example, in one or more embodiments the one or more processors of the electronic device 100 can cause at least two instances of video recorded during the video recording mode of operation on two different portions of the display. When one portion is situated atop the radius of the arm of the user 800 and the other situated atop the ulna of the user 800, this would allow both the user 800 and the subject of the video recording mode of operation to see what is being recorded.

In other embodiments, step 905 can include the performance of cropping operations on video captured while in the video recording mode of operation. Illustrating by example, in one or more embodiments step 905 can the one or more processors of the electronic device 100 cropping video segments captured by the image capture device while in the video recording mode of operation while the electronic device 100, such as when the gesture input 908 is being applied, is moving into the camcorder orientation in three-dimensional space.

Advantageously, the method of FIG. 9 allows for an intuitive and seamless method to transition their hand and forearm in three-dimensional space as if they were holding a traditional "camcorder" that was held with one hand with a viewfinder flipped outward from the main body of the camcorder. This resemblance is clearly shown at step 906. Thus, miming a camcorder support condition while the electronic device 100 is wrist-worn in the wrapped geometric form factor can provide nostalgic memories of the stand-alone video camcorder that existed primarily in the pre-smartphone era.

The method illustrated in FIG. 9 thus comprises detecting, with one or more sensors, a wrapped geometric form factor while the electronic device 100 is being worn on the wrist. The method also comprises detecting, with one or more other sensors, gesture input indicating a camcorder support condition is supporting the electronic device 100 while being wrist-worn in three-dimensional space, and while the wrapped geometric form factor is occurring. In one or more embodiments, when both are detected, one or more processors of the electronic device 100 enable a video recording mode of operation of an image capture device of the electronic device 100 at step 905.

In addition to automatic actuation of the video recording mode of operation, embodiments of the disclosure contemplate that capturing video while the electronic device 100 is being supported in the camcorder support condition offers unique benefits by stabilizing the electronic device 100 so that video captured is smoother and steadier. Additionally, when the electronic device 100 comprises a flexible display, as is the case in FIG. 9, the wrapped geometric form factor and camcorder support condition allows the user 800 (and optionally a subject of the video when two instances of the video are presented on the flexible display at different locations as described above) to see the video as its being captured as shown at step 905.

Since it can be quite difficult to access the user actuation targets and other control devices to initiate the capture of video recordings when the electronic device 100 is in a wrapped geometric form factor, embodiments of the disclosure advantageously automatically initiate the video recording mode of operation when a person has the electronic device 100 in a wrist-worn, wrapped geometric form factor and then lifts their arm so as to in the position of holding a traditional camcorder. When the deformable housing of the electronic device 100 is in the wrist-worn, wrapped geometric form factor, embodiments of the disclosure contemplate that it can be quite challenging to press a record user actuation target being presented on the flexible display wrapping around the wrist while supporting the electronic device 100 in a camcorder support condition. To overcome this issue, in one or more embodiments an "up/down gesture" while the wrist-worn, wrapped geometric form factor is occurring is used to initiate, or stop, a video recording session.

Figure 10:
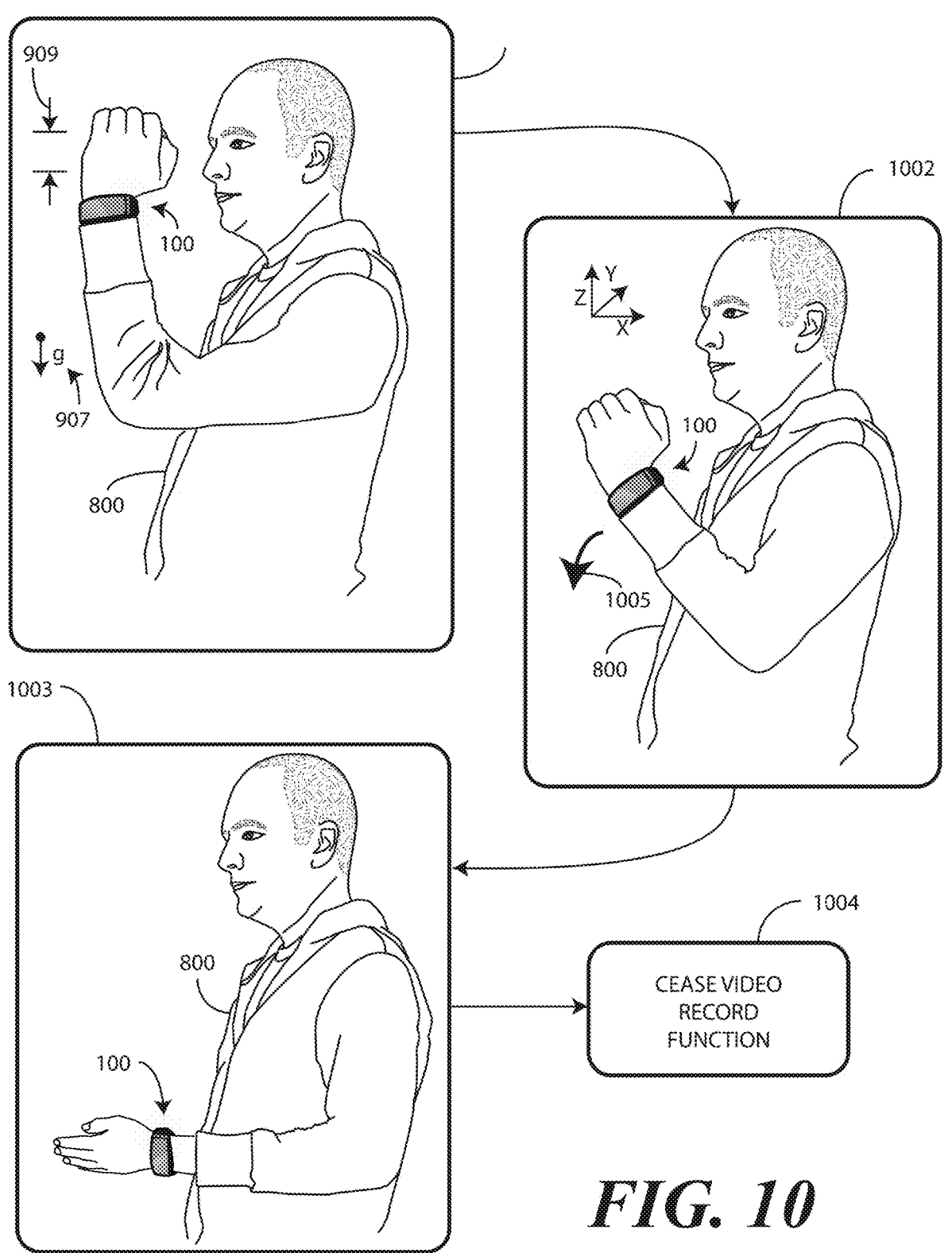
FIG. 10 illustrates another explanatory method in accordance with one or more embodiments of the disclosure.

The user 800 can stop the video recording mode of operation by taking opposite actions. Illustrating by example, when the user 800 desires to stop the video recording mode of operation, the user 800 pivots the electronic device 100 out of the camcorder support condition in the opposite direction. In one or more embodiments, this causes the video recording mode of operation to cease. In one or more embodiments, other features can be performed, such as trimming the ending segments of the video which encompass the final rotation to stop the video, thereby ensuring that no unwanted blurriness remains in the final video. Turning now to FIG. 10, illustrated therein is one or more method steps illustrating how this can occur.

Beginning at step 1001, the user 800 is holding the electronic device 100 in the camcorder support condition. However, at step 1002 the user begins to rotate 1005 the electronic device 100 in a counterclockwise, descending direction from a first elevation to a second elevation, at which the user 800 is holding the electronic device 100 at step 1003. In one or more embodiments, this simple cessation of the support of the electronic device 100 in the camcorder support condition causes the one or more processors to cease the video recording mode of operation of the image capture device at step 1004.

In other embodiments, the one or more processors can cause the video recording mode of operation to cease when the deformable housing is taken off the wrist or deformed out of the wrapped geometric form factor. Of course, a combination of the two methods could be used. Thus, had the user 800 simply straightened out the deformable housing of the electronic device 100 at step 1002, rather than pivoting it in three-dimensional space, the video recording mode of operation would cease as well.

Figure 11:
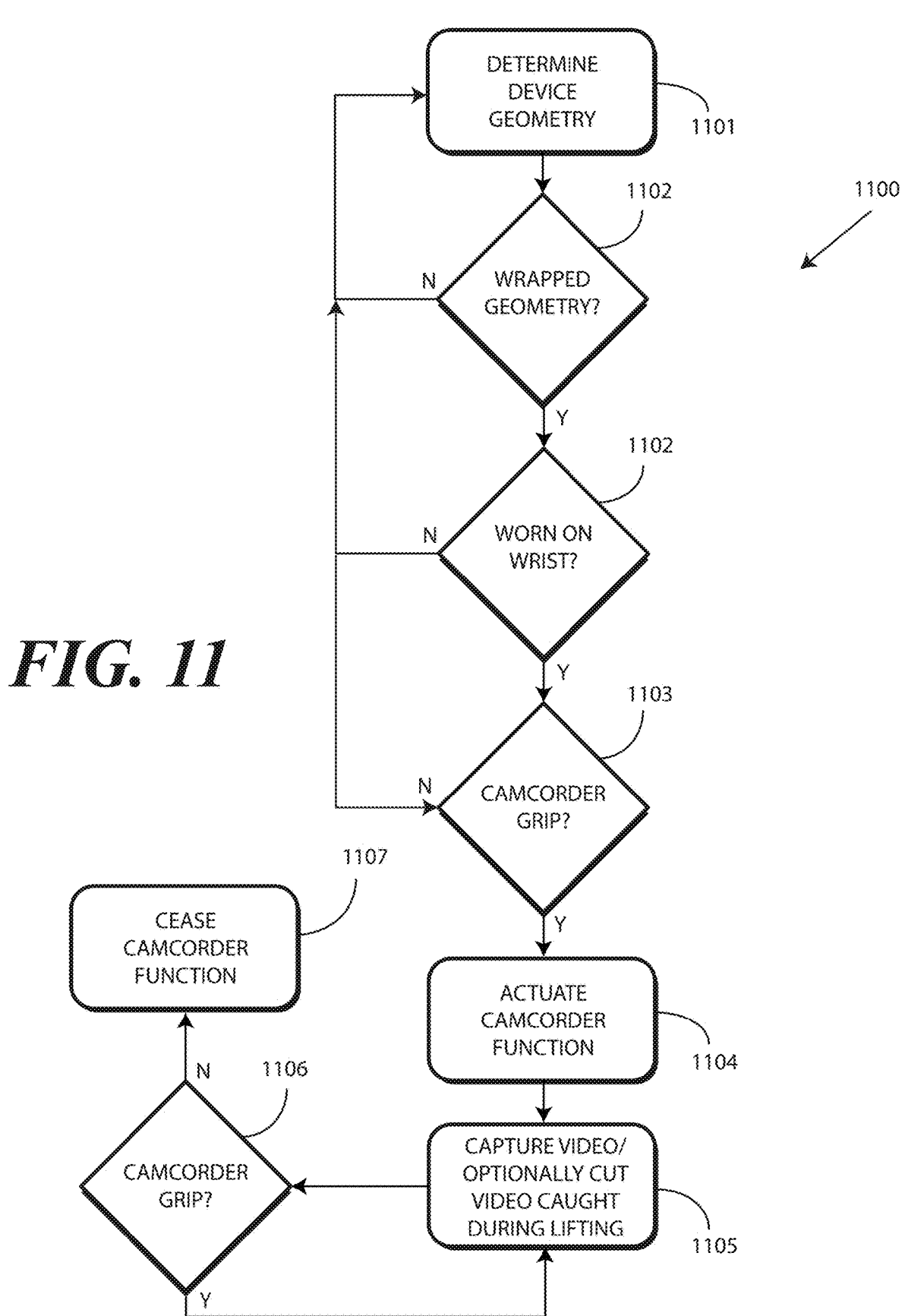
FIG. 11 illustrates still another explanatory method in accordance with one or more embodiments of the disclosure.

Turning now to FIG. 11, illustrated therein is one explanatory method 1100 in accordance with one or more embodiments of the disclosure. Beginning at step 1101, one or more sensors of the electronic device detect a geometric form factor of an electronic device having a deformable device housing. Decision 1102 then determines whether the geometric form factor is deformed to a wrapped geometric form factor. Where it is, decision 1103 determines whether the electronic device is worn on a wrist. Decision 1103 then determines whether the electronic device is being supported by an arm situated in three-dimensional space in a camcorder support condition. Otherwise, the method 1100 returns to step 1101.

Figure 12:
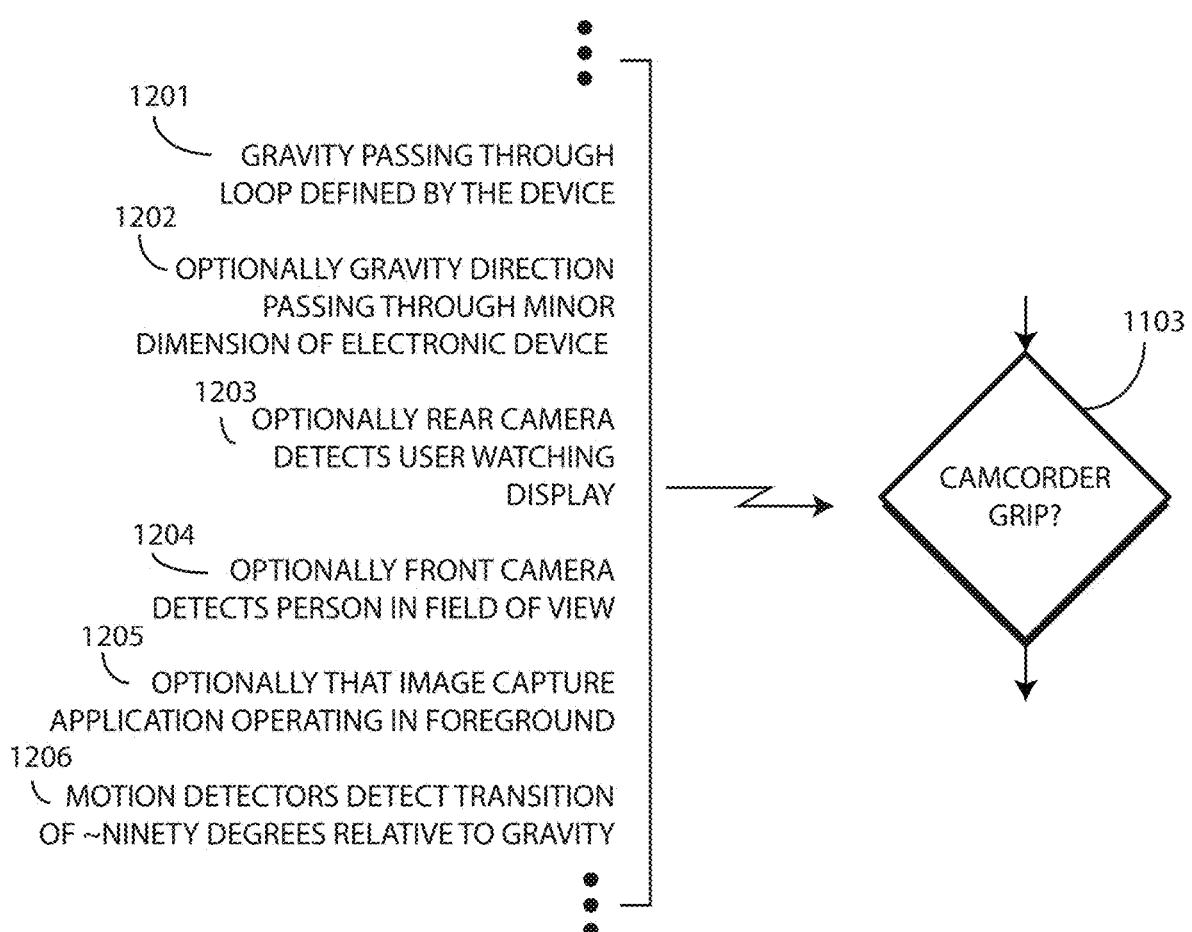
FIG. 12 illustrates one or more explanatory method steps in accordance with one or more embodiments of the disclosure.

Decision 1103 can be determined in a variety of ways. Turning briefly to FIG. 12, illustrated therein are a few examples. These examples can be used alone or in combination. Other examples will be obvious to those of ordinary skill in the art having the benefit of this disclosure.

In one or more embodiments, decision 1103 comprises determining whether a direction of gravity 1201 passes through a width of the deformable housing, or optionally through a loop 1202 defined by the deformable housing when in the wrapped geometric form factor.

In other embodiments, decision 1103 comprises determining whether a rear-facing image capture device 1203 captures images of a user looking at the electronic device. Illustrating by example, in one or more embodiments decision 1103 can also comprise determining whether a rear-facing image capture device is able to capture one or more images of an eye of a user of the electronic device.

In some embodiments, decision 1103 will only provide a trigger allowing the video recording mode of operation when a subject 1204 is situated within a field of view of the image capture device when the electronic device is supported by the camcorder support condition. In some embodiments, enablement of the video recording mode of operation by decision 1103 occurs only when a video application 1205 is operating as a foreground application of the electronic device. In some embodiments, decision 1103 comprises detecting a transition 1206 of at least ninety degrees in three-dimensional space. In one or more embodiment Turning now back to FIG. 11, if decision 1103 determines the electronic device is being supported by a camcorder support condition, step 1104 can comprise causing an image capture device of the electronic device to enter a video recording mode of operation. Otherwise, the method 1100 can return to step 1101.

Step 1105 can comprise performing a cropping operation to remove from one or more video clips of any video segments captured by the image capture device during the video recording mode of operation while the first device housing was moving about the hinge relative to the second device housing.

Decision 1106 can comprise detecting the geometric form factor changing. In one or more embodiments, decision 1106 comprises detecting, with one or more sensors, the deformable housing being transitioned out of the wrapped geometric form factor. Where this occurs, step 1107 can comprise disabling the video recording mode of operation of the image capture device of the electronic device. Otherwise, the video recording mode of operation can continue at step 1105.

Embodiments of the disclosure advantageously allow a user to elegantly start and stop a video recording mode of operation without having to rely upon physical keys, and without having to awkwardly tap a record user actuation target presented on a display of the electronic device. The gesture-based initiation of a video recording mode of operation allows for a more natural and "easy to learn" capability for the system. Other advantages offered by embodiments of the disclosure will be described below. Still others will be obvious to those of ordinary skill in the art having the benefit of this disclosure.

In addition to enabling the video recording mode of operation, other operations can be performed at step 1105 as well. Turning now to FIG. 13, illustrated therein are examples of some of these operations. Still others will be obvious to those of ordinary skill in the art having the benefit of this disclosure.

In one or more embodiments, step 1105 can comprise presenting 1301 two instances of the video captured by the video recording mode of operation at two different locations on the flexible display. Said differently, in one or more embodiments step 1105 can comprise detecting, with the image capture device, whether a person is within a field of view of the image capture device, and when the person is within the field of view of the image capture device, presenting 1301 a first instance of video recorded during the video recording mode of operation on a first portion of the flexible display situated on a first side of the wrapped geometric form factor and a second instance of the video recorded during the video recording mode of operation on a second portion of the flexible display situated on a second side of the wrapped geometric form factor.

In other embodiments, step 1105 comprises detecting 1302, with the image capture device, whether a person is within a field of view of the image capture device. In one or more embodiments, the image capture mode of operation comprises a preview mode of operation when the person is absent from the field of view of the image capture device. Another way about thinking about this detecting 1302 is determining, with the one or more sensors, a distance between the electronic device and a closest object to an exterior of the electronic device to see first is a subject is suitably within a field of view of the image capture device. In one or more embodiments, the enabling the video recording mode of operation at step 1105 occurs only when the distance is greater than a predefined distance threshold.

In still other embodiments, when the image capture mode of operation comprises a video recording mode of operation resulting in the image capture device capturing one or more video clips, step 1105 can comprise performing 1303, by the one or more processors, a cropping operation to remove from the one or more video clips any video segments captured by the image capture device while the gesture input was occurring. Image stabilization operations 1304 can be performed at step 1105 as well. As noted above, step 1105 can also comprise detecting 1305, with the one or more sensors, a reverse gesture input removing the camcorder support condition from supporting the electronic device in the three-dimensional space while the wrapped geometric form factor is occurring and disabling, with the one or more processors, the video recording mode of operation of the image capture device of the electronic device.

Of course, these other functions can be performed alone or in combination. Other additional functions that can occur at step 1105 will be obvious to those of ordinary skill in the art having the benefit of this disclosure.

Figure 14:
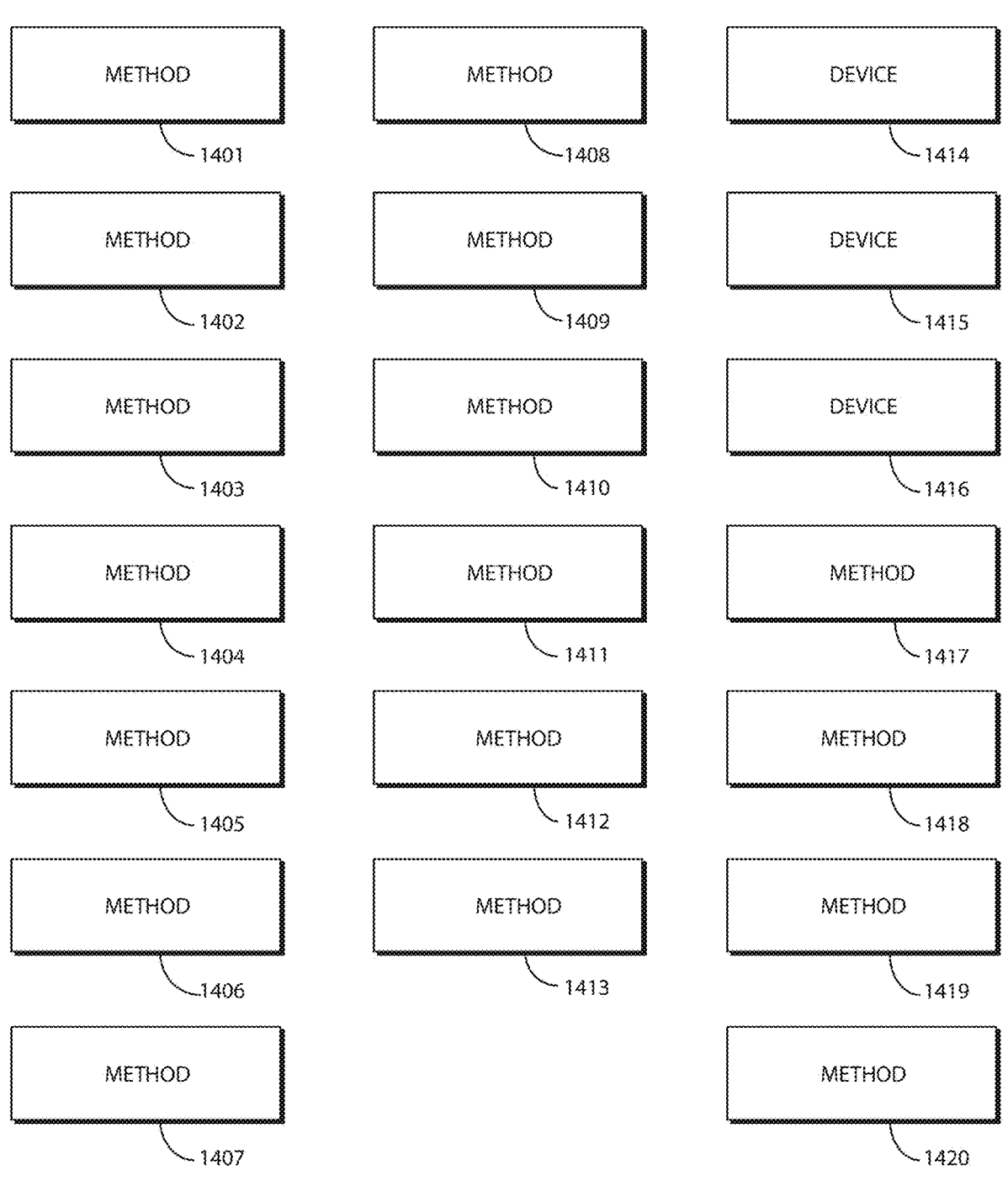
FIG. 14 illustrates various embodiments of the disclosure.

Turning now to FIG. 14, illustrated therein are various embodiments of the disclosure. The embodiments of FIG. 14 are shown as labeled boxes in FIG. 14 due to the fact that the individual components of these embodiments have been illustrated in detail in FIGS. 1-13, which precede FIG. 14. Accordingly, since these items have previously been illustrated and described, their repeated illustration is no longer essential for a proper understanding of these embodiments. Thus, the embodiments are shown as labeled boxes.

At 1401, a method in an electronic device comprises detecting, with one or more sensors, a wrapped geometric form factor defined by a flexible display supported by a deformable housing. At 1401, the method comprises also detecting, with one or more other sensors, gesture input indicating a camcorder support condition is supporting the electronic device in three-dimensional space while the wrapped geometric form factor is occurring. In one or more embodiments, at 1401 the method comprises enabling, with one or more processors in response to detecting the wrapped geometric form factor and the camcorder support condition, an image capture mode of operation of an image capture device of the electronic device.

At 1402, the image capture mode of operation of 1401 comprises a video recording mode of operation of an image capture device of the electronic device. At 1403, the method of 1402 comprises identifying, with the one or more sensors, a wrist-worn condition of the wrapped geometric form factor, wherein the enabling the video recording mode of operation occurs only when the wrist-worn condition is occurring.

At 1404, the method of 1402 further comprises determining, with the one or more sensors, a distance between the electronic device and a closest object to an exterior of the electronic device, wherein the enabling the video recording mode of operation occurs only when the distance is greater than a predefined distance threshold. At 1405, the method of 1402 further comprises determining, with one or more processors, whether an image capture application is operating as a foreground application when the one or more other sensors detect the gesture input. At 1405, the enabling the video recording mode of operation occurs only when the image capture application is operating as the foreground application when the one or more other sensors detect the gesture input.

At 1406, the method of 1402 further comprises detecting, with the image capture device, whether a person is within a field of view of the image capture device. At 1406, when the person is within the field of view of the image capture device, the method comprises presenting a first instance of video recorded during the video recording mode of operation on a first portion of the flexible display situated on a first side of the wrapped geometric form factor and a second instance of the video recorded during the video recording mode of operation on a second portion of the flexible display situated on a second side of the wrapped geometric form factor.

At 1407, the method of 1401 further comprises detecting, with the image capture device, whether a person is within a field of view of the image capture device. At 1407, the image capture mode of operation comprises a preview mode of operation when the person is absent from the field of view of the image capture device.

At 1408, the gesture input of 1401 comprises a lifting operation elevating the electronic device from a first position to a second position in the three-dimensional space. At 1409, the gesture input of 1401 comprises a lifting operation moving the electronic device to a position in the three-dimensional space where a gravity direction passes through a loop defined by the wrapped geometric form factor.

At 1410, the gesture input of 1401 comprises a lifting operation moving the electronic device to a position in the three-dimensional space where a gravity direction passes through a width of the deformable housing. At 1411, the gesture input of 1411 comprises a lifting operation moving the electronic device to a position in the three-dimensional space where another image capture device captures one or more images of an eye of a user of the electronic device.

At 1412, the image capture mode of operation of 1401 comprises a video recording mode of operation resulting in the image capture device capturing one or more video clips. At 1412, the method further comprises performing, by the one or more processors, a cropping operation to remove from the one or more video clips any video segments captured by the image capture device while the gesture input was occurring.

At 1413, the method of 1401 further comprises detecting, with the one or more sensors, a reverse gesture input removing the camcorder support condition from supporting the electronic device in the three-dimensional space while the wrapped geometric form factor is occurring. At 1413, the method comprises disabling, with the one or more processors, the video recording mode of operation of the image capture device of the electronic device.

At 1414, an electronic device comprises a deformable housing comprises a plurality of linkage members, a flexible display supported by the deformable housing, and one or more sensors operable to determine a wrapped, wrist-worn geometric configuration of the electronic device. At 1414, the electronic device comprises one or more other sensors operable to detect when the electronic device is supported in a camcorder orientation in three-dimensional space.

At 1414, the electronic device comprises an image capture device and one or more processors operable with the one or more sensors, the one or more other sensors, and the image capture device. At 1414, the one or more processors are operable to cause the image capture device to enter a video recording mode of operation in response to the electronic device being supported in the camcorder orientation while the electronic device is in the wrapped, wrist-worn geometric configuration.

At 1415, the one or more processors of 1414 are operable to cause the image capture device to cease the video recording mode of operation when the electronic device ceases to be either supported in the camcorder orientation or in the wrapped, wrist-worn geometric configuration. At 1416, the one or more processors of 1414 are operable to crop video segments captured by the image capture device while in the video recording mode of operation while the electronic device is moving into the camcorder orientation in three-dimensional space.

At 1417, a method in an electronic device comprises detecting, with at least a first sensor, a deformable device housing of the electronic device being transitioned to a wrapped geometry about a wrist. At 1417, the method comprises detecting, with at least a second sensor, a rotational lifting operation of the electronic device in three-dimensional space. At 1417, in response to the at least a first sensor detecting the wrapped geometry about the wrist and the at least a second sensor detecting the rotational lifting operation, the method comprises causing, with one or more processors, an image capture device of the electronic device to enter a video recording mode of operation.

At 1418, the lifting operation of 1417 causes a rotation of the electronic device in the three-dimensional space by at least ninety degrees. At 1419, the lifting operation of 1417 causes a gravity direction to pass through a loop defined by the wrapped geometry. At 1420, the method of 1417 further comprises presenting at least two instances of video recorded during the video recording mode of operation on two different portions of a flexible display supported by the deformable device housing.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A method in an electronic device, the method comprising:
    detecting, with one or more sensors, a wrapped geometric form factor defined by a flexible display supported by a deformable housing;
    also detecting, with one or more other sensors, gesture input indicating a camcorder support condition is supporting the electronic device in three-dimensional space while the wrapped geometric form factor is occurring; and
    enabling, with one or more processors in response to detecting the wrapped geometric form factor and the camcorder support condition, an image capture mode of operation of an image capture device of the electronic device.

2. The method of claim 1, wherein the image capture mode of operation comprises a video recording mode of operation of an image capture device of the electronic device.

3. The method of claim 2, further comprising identifying, with the one or more sensors, a wrist-worn condition of the wrapped geometric form factor, wherein the enabling the video recording mode of operation occurs only when the wrist-worn condition is occurring.

4. The method of claim 2, further comprising determining, with the one or more sensors, a distance between the electronic device and a closest object to an exterior of the electronic device, wherein the enabling the video recording mode of operation occurs only when the distance is greater than a predefined distance threshold.

5. The method of claim 2, further comprising determining, with one or more processors, whether an image capture application is operating as a foreground application when the one or more other sensors detect the gesture input, wherein the enabling the video recording mode of operation occurs only when the image capture application is operating as the foreground application when the one or more other sensors detect the gesture input.

6. The method of claim 2, further comprising:

detecting, with the image capture device, whether a person is within a field of view of the image capture device; and when the person is within the field of view of the image capture device, presenting a first instance of video recorded during the video recording mode of operation on a first portion of the flexible display situated on a first side of the wrapped geometric form factor and a second instance of the video recorded during the video recording mode of operation on a second portion of the flexible display situated on a second side of the wrapped geometric form factor.

7. The method of claim 1, further comprising detecting, with the image capture device, whether a person is within a field of view of the image capture device, wherein the image capture mode of operation comprises a preview mode of operation when the person is absent from the field of view of the image capture device.

8. The method of claim 1, wherein the gesture input comprises a lifting operation elevating the electronic device from a first position to a second position in the three-dimensional space.

9. The method of claim 1, wherein the gesture input comprises a lifting operation moving the electronic device to a position in the three-dimensional space where a gravity direction passes through a loop defined by the wrapped geometric form factor.

10. The method of claim 1, wherein the gesture input comprises a lifting operation moving the electronic device to a position in the three-dimensional space where a gravity direction passes through a width of the deformable housing.

11. The method of claim 1, wherein the gesture input comprises a lifting operation moving the electronic device to a position in the three-dimensional space where another image capture device captures one or more images of an eye of a user of the electronic device.

12. The method of claim 1, wherein the image capture mode of operation comprises a video recording mode of operation resulting in the image capture device capturing one or more video clips, further comprising performing, by the one or more processors, a cropping operation to remove from the one or more video clips any video segments captured by the image capture device while the gesture input was occurring.

13. The method of claim 1, further comprising:

detecting, with the one or more sensors, a reverse gesture input removing the camcorder support condition from supporting the electronic device in the three-dimensional space while the wrapped geometric form factor is occurring; and disabling, with the one or more processors, the video recording mode of operation of the image capture device of the electronic device.

14. An electronic device, comprising:

a deformable housing comprises a plurality of linkage members;

a flexible display supported by the deformable housing;

one or more sensors operable to determine a wrapped, wrist-worn geometric configuration of the electronic device;

one or more other sensors operable to detect when the electronic device is supported in a camcorder orientation in three-dimensional space;

an image capture device; and one or more processors operable with the one or more sensors, the one or more other sensors, and the image capture device, the one or more processors operable to cause the image capture device to enter a video recording mode of operation in response to the electronic device being supported in the camcorder orientation while the electronic device is in the wrapped, wrist-worn geometric configuration.

15. The electronic device of claim 14, wherein the one or more processors are operable to cause the image capture device to cease the video recording mode of operation when the electronic device ceases to be either supported in the camcorder orientation or in the wrapped, wrist-worn geometric configuration.

16. The electronic device of claim 14, wherein the one or more processors are operable to crop video segments captured by the image capture device while in the video recording mode of operation while the electronic device is moving into the camcorder orientation in three-dimensional space.

17. A method in an electronic device, the method comprising:

detecting, with at least a first sensor, a deformable device housing of the electronic device being transitioned to a wrapped geometry about a wrist;

detecting, with at least a second sensor, a rotational lifting operation of the electronic device in three-dimensional space; and in response to the at least a first sensor detecting the wrapped geometry about the wrist and the at least a second sensor detecting the rotational lifting operation, causing, with one or more processors, an image capture device of the electronic device to enter a video recording mode of operation.

18. The method of claim 17, wherein the lifting operation causes a rotation of the electronic device in the three-dimensional space by at least ninety degrees.

19. The method of claim 17, wherein the lifting operation causes a gravity direction to pass through a loop defined by the wrapped geometry.

20. The method of claim 17, further comprising presenting at least two instances of video recorded during the video recording mode of operation on two different portions of a flexible display supported by the deformable device housing.

* * * * *